(12) United States Patent
Seider et al.

(10) Patent No.: US 12,551,141 B2
(45) Date of Patent: Feb. 17, 2026

(54) APPARATUS FOR NON-INVASIVE MEASUREMENT OF GLUCOSE IN BLOOD

(71) Applicants: Evgeny Seider, Rehovot (IL); Naum Chernoguz, Karmiel (IL)

(72) Inventors: Evgeny Seider, Rehovot (IL); Naum Chernoguz, Karmiel (IL)

( * ) Notice: Subject to any disclaimer, the term of this patent is extended or adjusted under 35 U.S.C. 154(b) by 762 days.

(21) Appl. No.: 17/792,785

(22) PCT Filed: Dec. 30, 2020

(86) PCT No.: PCT/IL2020/051361
§ 371 (c)(1),
(2) Date: Jul. 14, 2022

(87) PCT Pub. No.: WO2021/149042
PCT Pub. Date: Jul. 29, 2021

(65) Prior Publication Data
US 2023/0041114 A1  Feb. 9, 2023

(30) Foreign Application Priority Data
Jan. 22, 2020 (IL) .......................................... 272180

(51) Int. Cl.
*A61B 5/145* (2006.01)
*A61B 5/1455* (2006.01)

(52) U.S. Cl.
CPC ...... *A61B 5/14532* (2013.01); *A61B 5/14558* (2013.01); *A61B 2562/0242* (2013.01)

(58) Field of Classification Search
CPC ............ A61B 5/14532; A61B 5/14558; A61B 2562/0242
See application file for complete search history.

(56) References Cited

U.S. PATENT DOCUMENTS 4,883,953 A   11/1989   Koashi et al.
4,901,728 A    2/1990   Hutchison
(Continued)

OTHER PUBLICATIONS

Asmat Nawaz; Review: Non-Invasive Continuous Blood Glucose Measurement Techniques; Journal of Bioinformatics and Diabetes, vol. No. 1 Issue No. 3, Norway 2016 (pp. 1-27).
(Continued)

*Primary Examiner* — Christian Jang
(74) *Attorney, Agent, or Firm* — Millen, White, Zelano & Branigan, P.C.; Jennifer L. King (57) ABSTRACT

The present invention relates to a non-invasive blood glucose measuring apparatus, for measuring the glucose level in an object of measurement, comprising: (a) an irradiation source, for irradiating a narrow-band wavelength light into said object of measurement containing a blood vessel; (b) an optical detector, for collecting and processing some of the light, irradiated by said irradiating source, which is back-scattered from the object of measurement, (c) sampling means, for sampling said orthogonally polarized beams, provided by said detector-amplifiers, for converting the data of said orthogonally polarized beams into digital codes; and (d) a computing unit, wherein said computing unit comprises an adaptive filter for enhancing the cardiac pulse pulsatile waveform, and wherein said computing unit computes the glucose level, in said object of measurement, by averaging of said sampled codes.

6 Claims, 3 Drawing Sheets

(56) References Cited

U.S. PATENT DOCUMENTS

| | | | |
|---|---|---|---|
| 5,009,230 | A | 4/1991 | Hutchinson |
| 5,313,941 | A | 5/1994 | Braig et al. |
| 5,383,452 | A | 1/1995 | Buchert |
| 5,687,721 | A | 11/1997 | Kuhls |
| 5,820,557 | A | 10/1998 | Hattori et al. |
| 6,026,314 | A | 2/2000 | Amerov et al. |
| 7,251,516 | B2 | 7/2007 | Walker et al. |
| 7,627,357 | B2 | 12/2009 | Zribi et al. |
| 8,391,939 | B2 | 3/2013 | Herrmann |
| 8,743,355 | B2 | 6/2014 | Korman |
| 9,101,308 | B2 | 8/2015 | Korman |
| 9,320,463 | B2 | 4/2016 | Korman |
| 9,636,052 | B2 | 5/2017 | Korman |
| 9,717,444 | B2 | 8/2017 | Bosin et al. |
| 9,759,714 | B2 | 9/2017 | Bordelon et al. |
| 2005/0286055 | A1 | 12/2005 | Wang |
| 2009/0116012 | A1* | 5/2009 | Scarpaci ............... G01N 21/90 356/364 |
| 2016/0367175 | A1 | 12/2016 | Pasichnyk et al. |
| 2019/0101448 | A1* | 4/2019 | Lee ........................ G01J 4/04 |

OTHER PUBLICATIONS

Wilbert Villena Gonzales : The Progress of Glucose Monitoring—A Review of Invasive to Minimally and Non-Invasive Techniques, Devices and Sensors; Sensors 2019, 19(4), 800; https://doi.org/10.3390/s19040800 (pp. 1-45).

Mohd Norzaliman Mohd Zain: Photon counting polarimetry measurement towards non-invasive blood glucose monitoring; Conference: IEEE 5th International Conference on Photonics -2014 DOI:10.1109/ICP.2014.7002364 (pp. 1-4).

Tseng-Lin Chen: Noninvasive measurement of glucoseconcentration on human fingertip by optical coherence tomography; Journal of Biomedical Optics 23(4), 047001 (Apr. 2018) (pp. 1-10).

Marjan Gusev: Noninvasive Glucose Measurement Using Machine Learning and Neural Network Methods and Correlation with Heart Rate Variability; Journal of Sensors, vol. 2020 |Article ID 9628281 | https://doi.org/10.1155/2020/9628281 (pp. 1-14).

Written Opinion of the International Search Authority PCT/IL2020/051361 dated Apr. 5, 2021 (pp. 1-4).

International Search Report PCT/IL2020/051361 dated Apr. 5, 2021 (pp. 1-4).

\* cited by examiner

APPARATUS FOR NON-INVASIVE MEASUREMENT OF GLUCOSE IN BLOOD

TECHNICAL FIELD

The present invention relates to the measuring of the blood glucose level in a patient. Particularly, the present invention relates to a non-invasive glucose measuring apparatus or glucometer capable of measuring the blood glucose level without pricking the patient.

BACKGROUND

For several decades, a non-invasive method and device for the blood glucose measuring, without incision or the insertion of any instruments or medical devices into the patient's body, has been sought. Different non-invasive methods have been developed and intensively studied, including reverse iontophoresis, bioimpedance spectroscopy, thermal emission spectroscopy, absorbance (near-infrared and mid-infrared) spectroscopy, photoacoustic spectroscopy, Raman spectroscopy, ocular spectroscopy, fluorescence, ultrasound, electromagnetic sensing, temperature-regulated localized reflectance, optical coherence tomography, and metabolic heat transformation. However, until today none of the reported methods have matured into a commercially successful non-invasive glucometer because of many issues, including insufficient accuracy and stability, slow reaction to changes in the glucose level, dependence upon the patient condition, high cost, and apparatus complexity. As of today, a personal non-invasive glucometer is still desired.

In the past, many non-invasive glucometer devices were based on the polarimetric method. The main reason for using polarimetry is that the polarization orientation shift depends primarily on glucose concentration, whereas other constituents of the blood have a relatively weak effect on the shift. The dissolved sugar, in the blood, rotates the linearly polarized light clockwise from its original polarization direction due to the sugar optical activity. The glucose molecule shifts the angle of the polarization vector according to the glucose concentration and to the optical path length. On the other hand, difficulties arise because of a small amount of glucose in the blood and numerous obstructive factors, including—but not limited to—low signal-to-noise ratio, optical noise, scattering from the skin, strong absorption, and multiple light propagation ways.

Small amounts of glucose in the blood and the strong depolarization effect of tissue may cause low sensitivity to glucose. Generally, there are two basic trends for settling the problem, firstly, the design of more sophisticated apparatus and, secondly, the use of a rich glucose object of measurement.

In a series of publications such as U.S. Pat. Nos. 8,743, 355, 9,101,308, 9,320,463, 9,636,052, and 9,759,714, an emitted light is transmitted through the patient earlobe, which is a thin, rich in blood object, and contains no bones. However, the two polarized light waves propagate through different optical ways, and the difference in their intensities may reflect not only the glucose concentration but also the difference of optical lengths as well. Since the two disclosed detectors are some distance apart from each other, the optical paths to them may be considerably different. The authors of the above-mentioned inventions also suggest to apply an auxiliary circuit to compensate the arising difference, however, the result may crucially depend on the circuit calibration. The repeatability of measurements may be insufficient because of different factors, including—but not limited to—patient condition and sensor location on the earlobe.

Another known option for solving the problem, of the low sensitivity of the polarimetric glucometer, is to apply some methods borrowed from other optical techniques. As known from the near-infrared spectroscopy, the light beam can penetrate deeply in living tissues, depending on the light power and wavelength. Thus, U.S. Pat. No. 4,883,953 discloses the use of a spectroscopic method in which the glucose concentration is determined by comparing the absorption spectrum of the sugar at different depths. By contrast, while using different wavelengths in polarimetric method one should take into account not only the light absorption but the ability of the glucose molecule to rotate the polarization plane at different wavelengths. However, the result may be obscured by dissimilar optical ways at different wavelengths.

U.S. Pat. No. 5,820,557 describes the use of two different wavelengths, with the light of one wavelength serving as reference light and the light of another wavelength serving as the measuring light. U.S. Pat. No. 6,026,314 discloses the use of three near-infrared wavelengths for determination of the blood components as glucose, hemoglobin, etc. In these methods, however, the unlikeness of optical ways confuses the outcome.

U.S. Pat. Nos. 4,901,728 and 5,009,230 have both described the use of two orthogonal polarized states of infrared light of minimal absorption, producing two separated in time square-modulated equal-intensity light waves of different polarization (0 and 90 degrees). In order to compensate for absorption in tissue, two orthogonal and equal polarized states of infrared light with another wavelength, e.g., being selected to maximize absorption, are used. Two disadvantages, that are also mentioned by U.S. Pat. No. 5,687,721, are: (1) the measured angle is obscured by harmonics produced by the "rectangular pulse" and, (2) it is limited to light transmission measurements, the method applies only to body parts which can be directly irradiated. Another disadvantage is that computation of the polarization rotation through the Lambert-Beer equation requires the attenuation coefficient and effective optical length, which are two uncertain parameters that can't be accurately determined in vivo. Moreover, two beams with different polarization may pass through different optical ways. Yet another disadvantage is that the polarization orientation for the polarizer and splitter may be inaccurate so that the actual polarization angles are not exactly the desired 0 or 90 degrees.

Employing the Lambert-Beer based approach, U.S. Pat. No. 5,687,721 has described the polarization modulator by including a periodically rotating polarizer for simultaneous phase modulation. Other options have been described as well, including the use of the diffraction measurements. In particular, by measuring the phase shift produced by the measurement object with respect to the reference phase, the glucose level is determined through the static extinction measurement—related to the tissue and blood—and simultaneously through the dynamic measurement—related exclusively to the pulsating portion of blood. However, the application does not mention the absorption coefficient variation induced by the rotating polarization. Another disadvantage is that the described diffraction scheme may induce an elliptic polarization rather than the desired circular one.

U.S. Pat. No. 9,717,444 discloses several embodiments for improving the precision of glucose measuring by methods including (a) Different water transparency windows from 1.35 µm, or from 1.55 µm to 1.85 µm, or from 2.10 µm to 2.30 µm; (b) Rotating polarizers; and (c) Readouts synchronized with the blood pressure pulse maxima. In still another embodiment, the polarized beam passes through the fingertip forward and backward several times, however, it was not explained how to overcome the problem of light attenuation and depolarization in the living sample. Further attempts for improving the glucose measurement precision described in US 2016/0367175 deal with oscillating polarization angle, an approximation of the glucose-to-output function, and calibration.

Many previous devices attempted to benefit from the cardiac pulse waveform. In the publications, U.S. Pat. Nos. 5,313,941 and 5,383,452, the emitted pulses of infrared light are synchronized with the systole and diastole of the patient cardiac pulse. The pulsatile blood component was described by U.S. Pat. No. 5,687,721 for dynamic measurements. In U.S. Pat. No. 8,391,939 the blood glucose level is determined by comparing transmittance over backscattering in different phases of the cardiac pulse. In U.S. Pat. No. 9,717,444 readouts are synchronized with the blood pressure pulse maxima. Nevertheless, while ignoring certain segments of the blood pressure pulse one may lose part of the information that can be of importance.

In the past, devices realizing various forms of the irradiating and sensing means were known as well. U.S. Pat. No. 6,026,314 describes how the patient skin is illuminated through a narrow-focus diaphragm oriented orthogonally to the illuminated skin. The sensing means in this device is designed to collect the light, in the vicinity of the diaphragm, as much back-scattered light as possible, and simultaneously to avoid reflection from the skin surface. However, the back-scattered photons coming from different directions pass through different optical ways. As disclosed in the application, the variation of the spectral baseline can overwhelm the spectral features of blood constituents.

It is clear, from the above short review, that the prior art polarimetric glucometer methods traditionally suffer from several drawbacks. First, applying the polarized optical signal, one may encounter the problem of low glucose concentration in blood. Another problem may be caused by optically active blood constituents and side effects obscuring the effect of glucose. The back-scattered light is drastically attenuated and strongly contaminated by non-polarized and skin scatterings, causing nearly complete depolarization of the linearly polarized irradiated light. With either transmitted or reflected light, the existence of multiple optical ways between the light source and the optical detector complicates the determination of the so-called "effective length" and "layer thickness" parameters and therefore makes difficult the use of the Lambert-Beer law. The method of modulated polarization increases the signal/noise ratio, however, requires a more complex apparatus and a proper calibration.

It would, therefore, be desired to propose a system void of these deficiencies.

SUMMARY

It is an object of the present invention to provide a non-invasive apparatus for determining the blood glucose concentration of a patient.

It is another object of the present invention to provide a personal glucometer allowing for discrete measurements during long-term monitoring of the blood glucose concentration.

It is still another object of the present invention to provide a non-invasive, affordable blood glucose measuring apparatus, that is reliable, accurate, and fast, that can be simply calibrated, and conveniently used, for measuring the blood glucose concentration in an object of measurement.

It is still another object of the present invention to provide a non-invasive blood glucose measuring apparatus that is not limited to a specific body part.

Other objects and advantages of the invention will become apparent as the description proceeds.

The present invention relates to a non-invasive blood glucose measuring apparatus, for measuring the glucose level in an object of measurement, comprising: (a) an irradiation source, for irradiating a narrow-band wavelength light into said object of measurement containing a blood vessel, comprising: a light-emitting source, for emitting a single narrow-band wavelength light beam of a narrow spectral shape; an output polarizer, for polarizing said emitted narrow-band wavelength light beam into a single linearly polarized light beam; and a limiting aperture diaphragm, for irradiating the linearly polarized light into said object of measurement, in orthogonally to the illuminated surface of said object of measurement; (b) an optical detector, for collecting and processing some of the light, irradiated by said irradiating source, which is back-scattered from the object of measurement, comprising: a Light Receiving Tube (LRT), for collecting some of said back-scattered light, which is essentially normal to the plane of the surface of said object of measurement, where said LRT, is in contact with the surface of said object of measurement at a point spatially separated, by a fixed distance, from the irradiation point of said irradiating source where said collected back-scattered light comprises at least part of the back-scattered beam that has propagated through said blood vessel, which serves as an optical waveguide, between said light-emitting source and said LRT; a beam splitter, for splitting said collected back-scattered light from the object of measurement, into two separate light beams; at least two polarizers, for polarizing said two separate light beams into two orthogonally polarized beams; and at least two detector-amplifiers for detecting and amplifying the intensities of said two orthogonally polarized beams; (c) sampling means, for sampling said orthogonally polarized beams, provided by said detector-amplifiers, for converting the data of said orthogonally polarized beams into digital codes; and (d) a computing unit, for computing the glucose level in said object of measurement by processing said digital codes of said sampled orthogonally polarized signal, sensed by said detector-amplifiers; (e) wherein said computing unit comprises an adaptive filter for enhancing the cardiac pulse pulsatile waveform, affected by noise and respiration trend, and wherein said computing unit computes the glucose level, in said object of measurement, by averaging of said sampled codes.

Preferably, the blood glucose measuring apparatus further comprises a narrowband optical filter, for extracting a particular wavelength of said back-scattered light.

Preferably, the blood glucose measuring apparatus further comprises a comparator, for providing the divergence of intensities of the two orthogonally polarized beams at the measurement phase, in contrast to the equality of intensities in said equalized state recorded for said reference level of glucose.

Preferably, the blood glucose measuring apparatus further comprises a correct position indicator, indicating whether the apparatus positioned on said object of measurement senses the pulsating stream of blood through a vessel and wherein the correct position is justified by a high AC/DC ratio in the pulsatile waveform.

Preferably, the sampling means are used for sampling the orthogonally polarized beams, provided by said detector-amplifiers, for converting the data of said orthogonally polarized beams into digital codes.

Preferably, the sampling means provide oversampled digital codes, wherein the time of processing is sufficient to average instantaneous changes of the glucose concentration caused by physiological factors.

Preferably, the beam splitter, the polarizes, and the detector-amplifiers form two optically equalized channels.

Preferably, the blood glucose measuring apparatus further comprises: (a) determining means for determining the polarization angle of said light back-scattered from the patient body, wherein the polarization angle is determined by referring to intensities of the orthogonally polarized beams sensed by two distinct detectors, that have been equalized at least once at the phase of calibration; (b) calculating means for calculating the blood glucose value by referring to a predetermined relationship between said polarization angle and said blood glucose value, wherein the inclination of the detected polarization angle from the reference indicates the change of the blood glucose concentration with respect to the stored reference; and (c) calibrating means for storing the reference glucose measurements and fitting dependence between the optical signal intensities and glucose, wherein the dependence is fitted empirically by a polynomial updated with each new data obtained.

BRIEF DESCRIPTION OF THE DRAWINGS

The accompanying drawings and specific references to their details are herein used, by way of example only, to illustratively describe some of the embodiments of the invention. In the Drawings.

DETAILED DESCRIPTION

The terms of "front", "rear", "down", "up", "bottom", "upper", "horizontal", "vertical", "right", "left" or any reference to sides or directions are used throughout the description for the sake of brevity alone and are relative terms only and not intended to require a particular component orientation.

Figure 1:
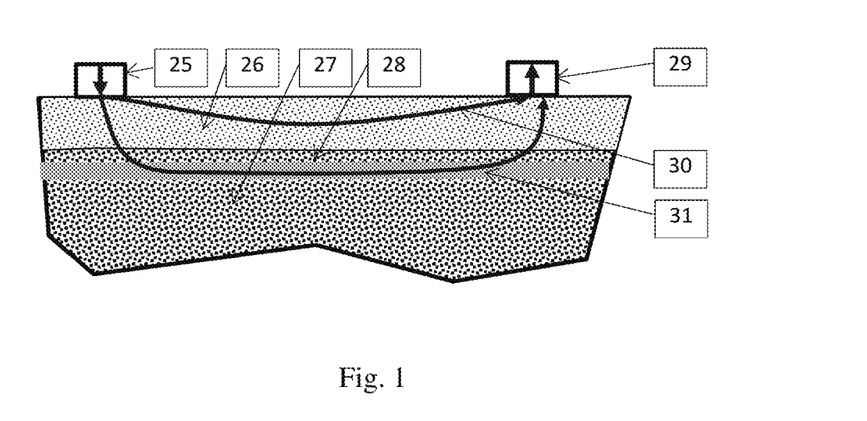
FIG. 1 is a diagram of a partial cross-section of the object of measurement, such as a patient's finger, and 2 possible optical paths of the light beams, traveling though the object of measurement, according to an embodiment of the invention.

FIG. 1 is a diagram of a partial cross-section of the object of measurement, such as a patient's finger, and 2 possible optical paths of the light beams, traveling though the object of measurement, according to an embodiment of the invention. The object of measurement may be part of a finger or any other object of measurements such as a part of the forehead or part of a wrist or any other body part containing a large blood vessel such as an artery. In the diagram, the cross-section, of the skin of the finger, may comprise the epidermis and dermis layer 26, the tissue layer 27, and a blood vessel 28. In one embodiment, the surface of the measured object is irradiated by a narrow-band wavelength light, from an irradiation source 25. An optical detector 29, may be used for collecting and processing some of the light, irradiated by said irradiating source, which is back-scattered from the object of measurement. In one embodiment, the optical detector 29 may be positioned at a fixed distance from said the irradiating source 25. The optical detector 29 may collect the light beams that have propagated through the object, such as the light beam of optical way 30, which has not propagated through blood vessels, and the light beam of optical way 31, that has propagated through the blood vessel 28.

In one embodiment, a blood artery may be used as a blood vessel optical waveguide. The irradiating and collecting parts of the system may be attached close to a particular blood vessel(s) so that the optical path direction fits the vessel orientation. Multiple scattering of photons, inside the blood vessel flow, intensify the rotation of the polarization vector of the light while the depolarization effect in the blood remains relatively weaker than in the tissue layers. While the light transmitted through the tissue layers containing no blood is strongly depolarized, the light transmitted through the blood vessel(s) keeps polarization that is shifted by the blood glucose. The angular shift of the scattered polarized light is, therefore, more likely related to glucose in the blood flow of the blood vessel, e.g. artery, rather than to the glucose in the tissue layer. The glucose variation may be sensed directly from the blood flow after 1-3 minutes, without considerable delay of, e.g. 10-15 minutes, that is typically associated with the blood circulation in a tissue. Therefore, the light scattered from the blood flow may be separated from the light scattered from the tissue, as will be described below.

Figure 2:
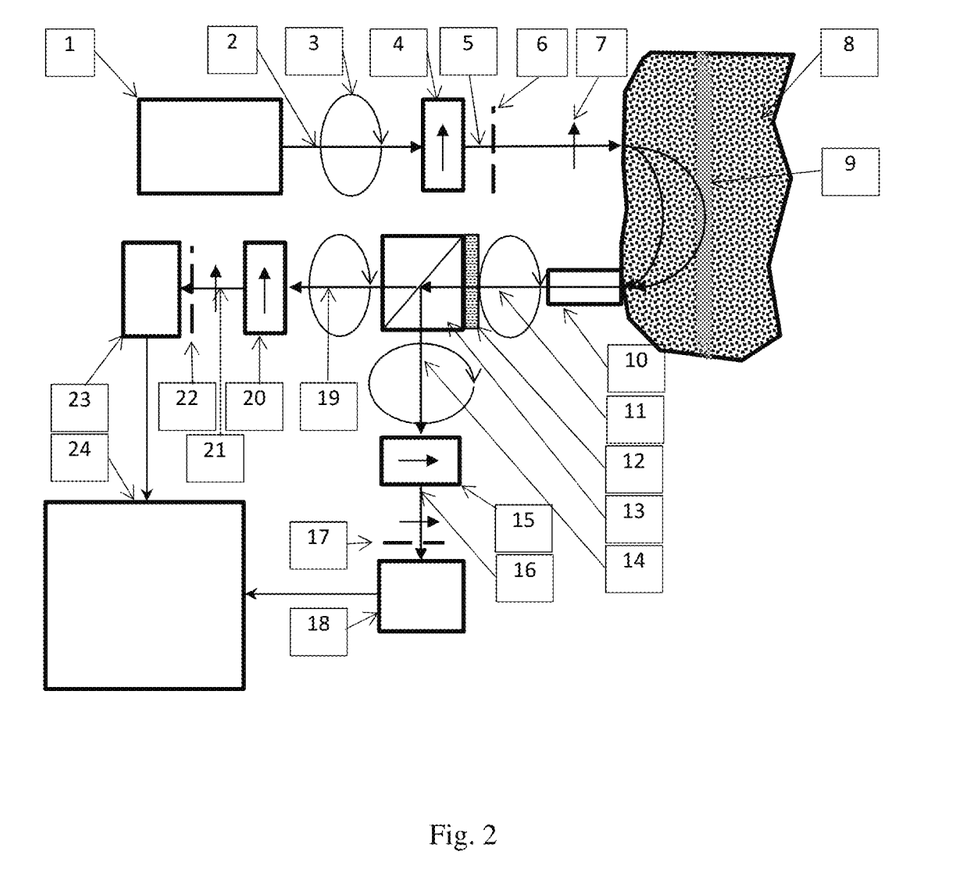
FIG. 2 is a schematic diagram illustrating some of the components of the non-invasive blood glucose measuring apparatus, according to an embodiment of the invention.

FIG. 2 is a schematic diagram illustrating some of the components of the non-invasive blood glucose measuring apparatus, according to an embodiment of the invention. The reflection-based, non-invasive, glucose measuring apparatus, referred to hereinafter as a glucometer, may be used for measuring the blood glucose concentration in the blood of an object of measurement. The light-emitting source 1, of the irradiation source of the glucometer, may comprise a laser, or any other light source, capable of emitting a narrow-band wavelength light of a narrow spectral shape. In one embodiment the light-emitting source 1 may produce a collimated output beam 2 having a circular polarization 3. The light beam 2, with its circular polarization 3, can be propagated through an output polarizer 4 for polarizing the incident light, into a linearly polarized light 5. The polarized light 5 may be passed through a small limiting aperture diaphragm 6 for irradiating the linearly polarized light 7 into the object of measurement, in orthogonally to the illuminated surface of said object of measurement 8. In one embodiment, the polarized light 7 is passed through a small limiting aperture diaphragm, oriented orthogonally to the illuminated surface of the object of measurement, where the created light beam 7 is illuminated into the object of measurement 8. The orthogonal orientation of the illuminating light beam 7, with respect to the illuminated surface, facilitates penetration of the irradiated photons through the skin and simultaneously attenuates backscattering from the upper skin layers. The laser power may allow the irradiated photons to reach a blood vessel, such as a blood artery 9, at the depth of 3-5 mm. In some embodiments, the glucometer may suffice with a less powerful laser of 10-20 mW if deeper layers may not be of interest.

In FIG. 2, the optical detector, of the apparatus, may have a long and narrow Light Receiving Tube (LRT) 10, which may be in contact with the surface of the object, for collecting the back-scattered light from the object of measurement 8. The LRT 10, which may be in contact with the surface of the object of measurement and positioned at a point spatially separated by a fixed distance from the irradiating source, may be used for collecting some of the back-scattered light from the said object of measurement. In one embodiment, the LRT 10 may be used for collecting some of said back-scattered light, which is essentially normal to the plane of the surface of the object of measurement. In other words, the LRT 10 may be used for collecting back-scattered light which has been scattered at between 80-100° in relations to the plane of the surface of the object of measurement. In the presence of glucose in the object of measurement, the detected back-scattered light 11 may have a different orientation than the light beam 7, that was illuminated into the object of measurement 8. The optical detector may also have a narrowband optical filter 12 with a beam splitter 13, for splitting the collected backscattered light into 2 separated light beam channels, e.g. X and Y axes channels. The optical detector may also have a polarizer 15, a regulating aperture diaphragm 16 and a photo detector-amplifier 18, for the Y-axis channel, on one hand, and a polarizer 20, a regulating aperture diaphragm 22, and photo detector-amplifier 23 for the X-axis channel, on the other hand. Both polarizers, 15 and 20, may each be used for polarizing each of the separated light beam channels into two orthogonally polarized beams. Both detector-amplifiers, 23 and 18, may each be used for detecting and amplifying each of the intensities of the two orthogonally polarized light channel beams. Both detector-amplifiers 23 and 18 may be connected to the computing unit 24 for comparing the readings from both channels. Since both orthogonally polarized beams have passed the same optical path through the object of measurement, the angular shift of the irradiated linearly polarized light 7 can mainly be attributed, to a large extent, by the glucose content, provided the fixed optical path.

In one embodiment, LRT 10 is designed as a long and narrow tube which may be 10 mm in length and 2.5 mm in diameter, respectively, with the aim of collecting some of the back-scattered light which comes essentially normal, e.g. between 75-105 degrees, to the plane of the surface of the object of measurement. The LRT design is motivated by two reasons: First, the light backscattered from deeper layers—assumingly, containing blood vessels—comes normal to the body surface; this light reaches the optical filter 12 at the far end of the LRT, unlike the light backscattered from upper layers and spread over different directions, which is absorbed by the LRT walls Second reason is that the narrowband optical filter 12 doesn't affect the polarization angle of the light coming nearly normal (e.g. 90°±15°) to the filter surface, which is not the case for the polarized light coming to the filter surface from other than the normal directions. Therefore, two novel features of the optical detector are, first, the capability to sense the light backscattered from the deeper layers containing the blood vessels and, second, the capability to preserve and sense the polarization shift caused by the fixed optical path. As a result, the detected optical signal bears the polarization shift which is related directly to the glucose content in the blood vessel. The problems of attenuation and depolarization of the detected light may be overcome by the means of calibration and signal processing, as this will be explained below.

In one embodiment, the optical detector may also have sampling means, for sampling the orthogonally polarized beams, from the detector-amplifiers, for converting the data of the orthogonally polarized beams into digital codes. For example, the specific rotation for the wavelength of 620-650 nm may be as high as +66.2 degrees (g/dl)−1 dm−1, for glucose. This means that to detect a change in concentration of 1 mg/dl, provided optical length of 10 mm, would require an accuracy of measurement of 0.0236 degrees. To this end, the apparatus may measure the ratio between the difference and sum of the intensities (normalized ratio) of two polarized beams, which may be as small as 0.0236*II/180≈0.0041. On the other hand, the residual polarization may be as small as 0.02-0.05. This means that said normalized ratio of the intensities of two polarized beams may constitute 2-5% of their total energy, which is equivalent to (0.02-0.05)×180/II/2≈0.57-1.43 degrees. The desired accuracy of 0.0236 degree may be reached using the oversampling and averaging. The sampling rate may be limited from above by the signal correlation and technical restrictions. With the moderate sampling rate of 100 sample/second a desired accuracy can be reached by averaging over ((0.57-1.43)/0.0236)2≈583-3671 samples or 5.8-36.7 seconds. This may be the minimal measurement time required for the instantaneous measuring of glucose content with the resolution of 1 mg/dl. This restriction may not be critical, for the apparatus, because a longer measurement period may be required to suppress the glucose variation caused by physiological factors such as the cardiac pulse and respiration trend.

In one embodiment, the digital codes may be transmitted to the computing unit for comparing the readings from both channels. The computing unit may process the digital codes, of the sampled orthogonally polarized signal, sensed by said detector-amplifiers. The computing unit may have an adaptive filter for enhancing the cardiac pulse waveform for determining the polarization angle, of said light back-scattered light from said object, for computing the glucose level in said object of measurement based on said polarization angle.

Since the back-scattered light, scattered from the object of measurement, is split in two light beam channels which are directed through orthogonally polarized lenses to two photodetectors, the difference between the amounts of energy sensed by the two photodetectors is related to the rotation, i.e. angular shift, of the polarization plane. Thus, the computing unit can compute the glucose level in an object of measurement by determining the angular shift, of said light back-scattered light from the object, by comparing the intensities of said orthogonally polarized light beams, sensed by said detector-amplifiers.

In one embodiment, the light-emitting source, of the monochromatic light, is a laser whose wavelength is selected from the range 620-650 nm in the tradeoff between high sensitivity to glucose, high absorption by blood, and low absorption by tissue. Commercial low-cost lasers providing from 635 nm to 670 nm may be used in the blood glucose measuring apparatus. In one embodiment, an irradiated light, from a laser narrowband such as 1.5-3 nm bandwidth, may be used to reduce the distortion of the spectral shape caused by different absorption coefficients at different wavelengths and may be used to reduce the sensitivity to the irrelevant constituents of blood occupying adjacent spectral lines, such as hemoglobin etc. The optical detector may be a transimpedance amplifier based on a silicon detector or photomultiplier tube.

In another embodiment, the LRT is displaced from the illuminated point of the surface alongside the blood vessel. Instead of sensing the light back-scattered in the vicinity of the illuminated point, the LRT senses the light back-scattered a distance apart from this point. A narrow long tube containing a condenser lens is attached orthogonally to the illuminated surface in a certain proximity to the illuminated surface. The tube hooks photons back-scattered from the object of measurement normally to the surface. The goal may be to prevent straight backscattering from the skin surface and hook photons that have passed through the blood vessel. The skin surface and upper tissue layers form shorter pathways through which a significant portion of backscattered light can reach the optical detector. The light scattered from the skin/tissue bears information about the glucose in tissue that should be separated from the light scattered from the moving artery blood, as it will be explained below.

In one embodiment, the intensity of the back-scattered light, received from the detector-amplifiers, is compared with a cardiac pulse waveform which is typically wavy, e.g. in Alternating Current (AC) form. Thus, the AC component, of the received light, indicates that the received photons are typically scattered from the pulsing arterial blood. On the other hand, photons received from other parts not necessarily containing pulsatile blood, such as from venous blood, skin, bone, muscle, fat, are typically in a Direct Current (DC) form relating to photons partially scattered from the pulsatile blood flow and partially from tissue layers. Basically, the DC component bears the main information about the glucose while the presence of the AC component indicates that the received light has been, at least partially, back-scattered from a moving blood vessel or from a pulsatile flow. AC is usually small with respect to DC and the AC/DC ratio may contain information about the measurement quality. The AC/DC ratio can be maximized by arranging the positions of the irradiation source and the LRT. In one embodiment, when the AC/DC nears the predefined maximum, the signal is accepted for further processing. In one embodiment, the maximum may be found by measuring the average amplitude over three-five seconds, where the maximum may be defined as a value three-five times higher than the mean difference between the two channels. Thus, the AC/DC ratio may serve as a trigger for the glucose-measuring procedure. Unlike some prior art devices, the DC signal, or any phase of the sensed AC signal, is not discarded, since this information may be used as well.

In one embodiment, a pre-filter may be applied to the detected signals. The aim of pre-filtering is to enhance the pulsatile signal induced by the cardiac pulse and separate the pulsatile component and the physiological trend in order to compute the AC/DC ratio with higher confidence. Traditional tools of pre-filtering are applicable as well, such as the detrend and/or adaptive comb filters.

In one embodiment, the objective is to neutralize factors that obscure the effect of glucose. The light polarization orientation is determined by comparing the two orthogonally polarized light constituents. The effect of glucose on the detected light polarization angle is obscured by factors caused by physiological phenomena and apparatus imperfectness. One of these factors is the misbalance between two optical channels caused by a difference (up to 13%) between the attenuation coefficients of the polarizers. Another factor is a constant bias between the channels caused by tissue. To exclude these and some other factors, the optical channels are equalized. The desired equivalence can be reached by adjusting the regulating aperture diaphragm in one (e.g., the 'stronger') of two channels. The procedure is monitored by comparing the signal waveforms received from two orthogonally polarized channels. It was observed that the equality of the signal DC baselines yields approximate equality of their AC amplitudes since the signal amplitude is nearly proportional to the signal baseline. The procedure of channel equalization deletes the contributions of tissue and moving blood in normal condition. As two orthogonally polarized components of the reference signal have been set identical, the arising during future experiments inequality between the orthogonally polarized light components can be related to the glucose concentration change. As the glucose change, the detected waveforms diverge and the difference between the waveforms is related to the glucose increment. It is reasonable to use the equalization point as a reference and define the reference at some usual for the patient level (e.g., 80-120 mg/dL) while keeping in mind future glucose variations.

Figure 3:
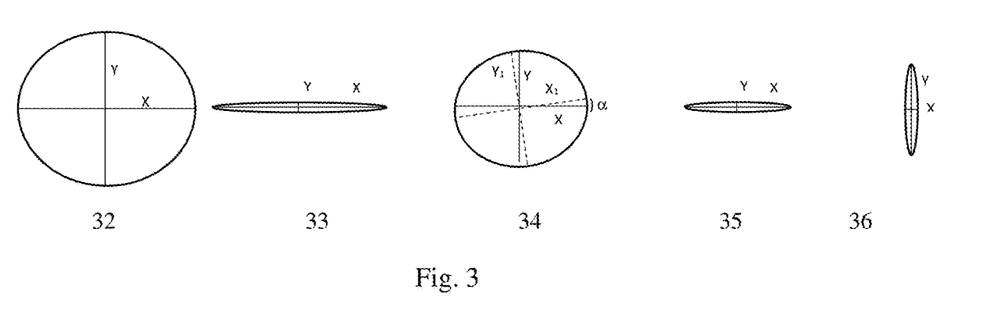
FIG. 3 illustrates the light beam transformation, according to an embodiment of the invention.

FIG. 3 illustrates the light beam transformation, according to an embodiment of the invention. The incident beam 32, e.g. the collimated output beam 2 in FIG. 1, is first converted into the polarized beam 33, e.g. 7 in FIG. 1, and further into the depolarized light 34, e.g. 11 in FIG. 1. The latter split into two beams 35 and 36, while the beam 35, e.g. 21 in FIG. 1, further passes through a polarizer coincidently oriented with respect to the output polarizer, whereas the beam 36, e.g. 16 in FIG. 1, passes through a polarizer orthogonally oriented with respect to the output polarizer.

As shown in FIG. 2, the optical paths of the irradiated light may or may not contain blood vessels. The blood vessel 9 may serve as a light guide and therefore increases the effective length of the optical path. Light transmitted through the blood vessel typically contains the effect of the glucose on its polarization. In contrast, the tissue layers cause stronger depolarization of the irradiated light. As a sufficient amount of light passes through the blood vessels, the remaining polarization of the light can be detected (FIG. 3.)

Figure 4A:
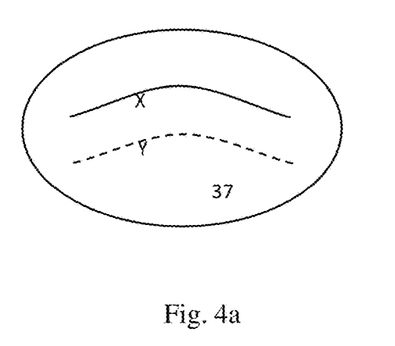
FIG. 4a depicts signals indicating that the light has passed through the tissue layers containing no blood vessels according to an embodiment of the invention.
Figure 4B:
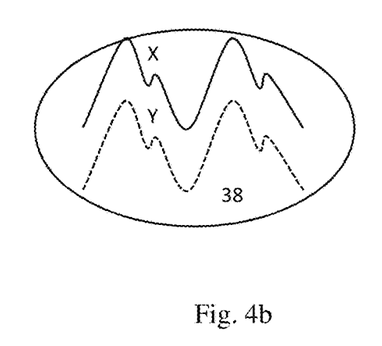
FIG. 4b depicts an apparent cardiac pulse of a signal indicating that the light has passed through an optical path that comprises a blood vessel, according to an embodiment of the invention.

Whether the optical path contains or does not contain a blood vessel can be determined by observing the waveform of the back-scattered optical signal. FIG. 4a depicts signals indicating that the light has passed through the tissue layers containing no blood vessels, whereas FIG. 4b depicts an apparent cardiac pulse of a signal indicating that the light has passed through an optical path that comprises a blood vessel. To obtain a pulsatile signal, the apparatus is preferably attached to the object of measurement in the vicinity of a blood vessel.

Figure 5:
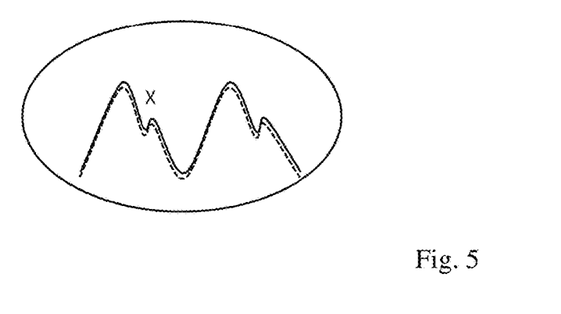
FIG. 5 depicts an apparent cardiac pulse of a signal obtained after equalization, according to an embodiment of the invention.

The blood vessel induces both AC and DC signal components, according to the alternating and constant parts of the blood flow. The DC component strongly dominates the AC component and therefore bears more information, whereas the AC component serves as an indicator of the measurement quality. To extract the DC component, related to the changing glucose level, the system may be initially arranged with regard to a particular, usually minimum, glucose level. At the given basic condition, e.g. 80-100 mg/dl, the regulating aperture 17 in the channel X, as described in relations to FIG. 1, or 23 in the channel Y—apply to equalize the transmitted optical signals. Signals obtained after equalization are schematically depicted in FIG. 5. The influence of tissue and other destructive factors is thus compensated, and as the glucose concentration changes the resulting difference signal becomes more sensitive to the glucose change with regard to the basic level.

Figure 6:
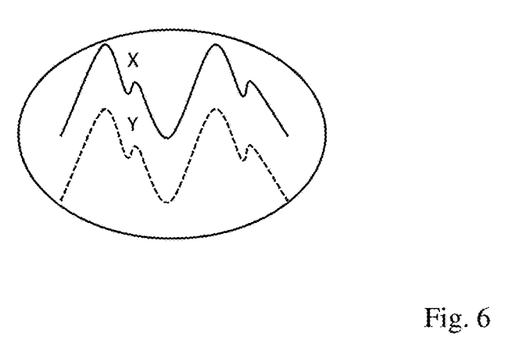
FIG. 6 depicts an apparent cardiac pulse of a signal after the glucose level changes, with regard to the basic level, according to an embodiment of the invention.

As the glucose level changes with regard to the basic level, the detected optical signals diverge, as depicted in FIG. 6. The difference between the mean levels of these signals is related to the glucose increment with regard to the preliminary measured basic level of glucose. The difference signal is converted into the glucose concentration using the pre-calibrated glucose curve.

In one embodiment, the system may be individually calibrated for each individual patient after equalizing the optical channels. The glucose curve calibration may require measuring of the glucose level by the proposed apparatus and simultaneously by a known-in-the-art reference unit. Measurements may be repeated for several maximally different levels of glucose distributed within the total measurement range, for instance, in the early morning before the food intake and/or 40-50 minutes after the food intake.

In one embodiment, the computation procedure may be determined as follows: let the optical source irradiate a linearly polarized beam with the polarization plane rotation of $\phi$ degrees so that the beam has two orthogonal components $I_x$ and $I_y$ along the polarization axes of angles 0 and 90 degrees, respectively:

$$I_x = I \cos^2\phi$$
$$I_y = I \sin^2\phi \quad (1)$$

As the light is transmitted without loss through the containing glucose medium, the orthogonally polarized detectors X and Y receive components with a shifted on $\alpha$ polarization orientation:

$$I'_x = I \cos^2(\phi-\alpha)$$
$$I'_y = I \sin^2(\phi-\alpha) \quad (2)$$

where $\alpha$ denotes the angle induced by glucose angular shift.

Adding and subtracting the intensities measured by the detectors give:

$$I'_x + I'_y = I$$

$$I'_x - I'_y = I[\cos^2(\phi-\alpha) - \sin^2(\phi-\alpha)] = I \cos[2(\phi-\alpha)] \quad (3)$$

Therefore, the angular shift $\alpha$ can be devised as $$\alpha = |\phi - 0.5 \arccos(\rho)| \quad (4)$$

where $|\cdot|$ means the absolute value, and the parameter $\rho$ is determined as the ratio:

$$\rho = \frac{I'_x - I'_y}{I'_x + I'_y}$$

In equation (4), $\phi$ is a design parameter. For $\phi=45$ degrees, $$\cos[2(\phi-\alpha)] = \cos(90-2\alpha) = \sin(2\alpha) \quad (6)$$

In this favorable case, the small parameter $\alpha$ can be devised straight in proportion to the ratio $\rho$:

$$\alpha \sim \rho \quad (7)$$

The sign of rotation is of importance because the glucose-induced rotation is always clockwise—this information can be used as a constraint.

In reality, the orthogonal components, X and Y described in relations to FIG. 2, are affected by the depolarization effect which adds a parasitic orthogonal component, not existing in the initial vector. Instead of (2), the detectors of X and Y may provide intensities subject to $$I'_x = \gamma I \cos^2(\phi-\alpha) + 0.5(1-\gamma)$$

$$I'_y = \gamma I \sin^2(\phi-\alpha) + 0.5(1-\gamma) \quad (8)$$

where $\gamma$ is a small parameter characterizing the depolarization effect. Accordingly, $$I'_x + I'_y = I$$

$$I'_x - I'_y = \gamma I \cos[2(\phi-\alpha)] \quad (9)$$

and $$\rho = \gamma \cos[2(\phi-\alpha)] \Rightarrow \alpha = |\phi - 0.5 \arccos(\gamma^{-1}\rho)| \quad (10)$$

In practice, $\gamma$ is a tuning parameter determined through calibration. For $\phi=45$ degrees, $$\alpha = 0.5 \arcsin(\gamma^{-1}\rho) \approx 0.5 \gamma^{-1} \rho \quad (11)$$

Equation (11) requires further modification. Equation (8) assumes that both orthogonal components obey the same attenuation factor $\gamma$. In reality, attenuation factors for different polarization orientations differ, as noticed in the above text. Respectively, equation (8) should be modified as $$I'_x = \gamma_x I \cos^2(\phi-\alpha) + 0.5(1-\gamma_x)I$$

$$I'_y = \gamma_y I \sin^2(\phi-\alpha) + 0.5(1-\gamma_y)I \quad (12)$$

where $\gamma_x$ and $\gamma_y$ are attenuation factors for the orthogonal X and Y components. Accordingly:

$$\begin{aligned}I'_x + I'_y &= I[\gamma_x\cos^2(\phi-\alpha) + 0.5(1-\gamma_x) + \gamma_y\sin^2(\phi-\alpha) + 0.5(1-\gamma_y)] \quad (13)\\ &= I[\gamma_x\cos^2(\phi-\alpha) + \gamma_y\sin^2(\phi-\alpha) + 1 - 0.5(\gamma_x+\gamma_y)]\\ &= I[0.5\gamma_x[1+\cos(2\phi-2\alpha)] + 0.5\gamma_y[1-\cos(2\phi-2\alpha)] +\\ &\quad 1 - 0.5(\gamma_x+\gamma_y)]\\ &= I[1 + 0.5\cos(2\phi-2\alpha)(\gamma_x-\gamma_y)]\end{aligned}$$

Similarly, $$\begin{aligned}I'_x - I'_y &= I[\gamma_x\cos^2(\phi-\alpha) + 0.5(1-\gamma_x) - \gamma_y\sin^2(\phi-\alpha) - 0.5(1-\gamma_y)] \quad (14)\\ &= I[\gamma_x\cos^2(\phi-\alpha) - \gamma_y\sin^2(\phi-\alpha) + 0.5(\gamma_x-\gamma_y)]\\ &= I[0.5\gamma_x[1+\cos(2\phi-2\alpha)] - 0.5\gamma_y[1-\cos(2\phi-2\alpha)] +\\ &\quad 0.5(\gamma_x-\gamma_y)]\\ &= I[(\gamma_x-\gamma_y) + 0.5(\gamma_x+\gamma_y)\cos(2\phi-2\alpha)]\end{aligned}$$

Of note, as $\gamma_x = \gamma_y = \gamma$ equation (13) reduces to the first equation (9) while equation (14) reduces to the second equation (9).

Under general conditions, as $\gamma_x \neq \gamma_y$, $$\rho = \frac{(\gamma_x - \gamma_y) + 0.5(\gamma_x+\gamma_y)\cos(2\phi-2\alpha)}{1 + 0.5\cos(2\phi-2\alpha)(\gamma_x-\gamma_y)} \quad (15)$$

Let us consider again the favorable case with $\phi=45$ degrees:

$$\rho = \frac{(\gamma_x - \gamma_y) + 0.5(\gamma_x + \gamma_y)\sin(2\alpha)}{1 + 0.5\sin(2\alpha)(\gamma_x - \gamma_y)} \tag{16}$$

Due to the above-given method that suggests equalizing the orthogonally polarized optical channels, one may assume $\gamma_x = \gamma_y$, and therefore equation (16) provides the convenient one-one relationship $$\rho \sim \alpha \tag{17}$$

As the optical channels equalized, the relationship between the measured ratio $\rho$ and the desired $\alpha$ becomes strictly linear. In reality, the measured ratio $\rho$ and computed from it $\alpha$ can be linked by a linear first-order equation. Keeping in mind the Lambert-Beer law, the glucose concentration C follows as $$C = \ln(\rho) \times k_0 + k_1 \tag{18}$$

where the coefficients $k_0$ (slope) and $k_1$ (bias) are subject to calibration.

For a wider range of glucose levels, the linear relationship may be replaced by a non-linear one. Using, e.g., an N-order polynomial gives $$C = \sum_{n=0:N} k_n \times \ln(\rho)^n \tag{19}$$

where the coefficients $k_n$, n=0:N is subject to calibration. The orders and parameters of the equation may be established empirically.

To obtain a pulsatile signal, the glucometer should be positioned in the vicinity of a proper blood vessel. The glucometer position can be arranged manually or with the aid of a means localizing the blood vessels under the skin. The irradiation source of the glucometer sends the polarized light as deep as possible into the object with the purpose to reach a blood vessel. On the other hand, the detecting part of the system hooks those photons that have passed the shortest optical path and, therefore, have been less depolarized by tissue.

Figure 7:
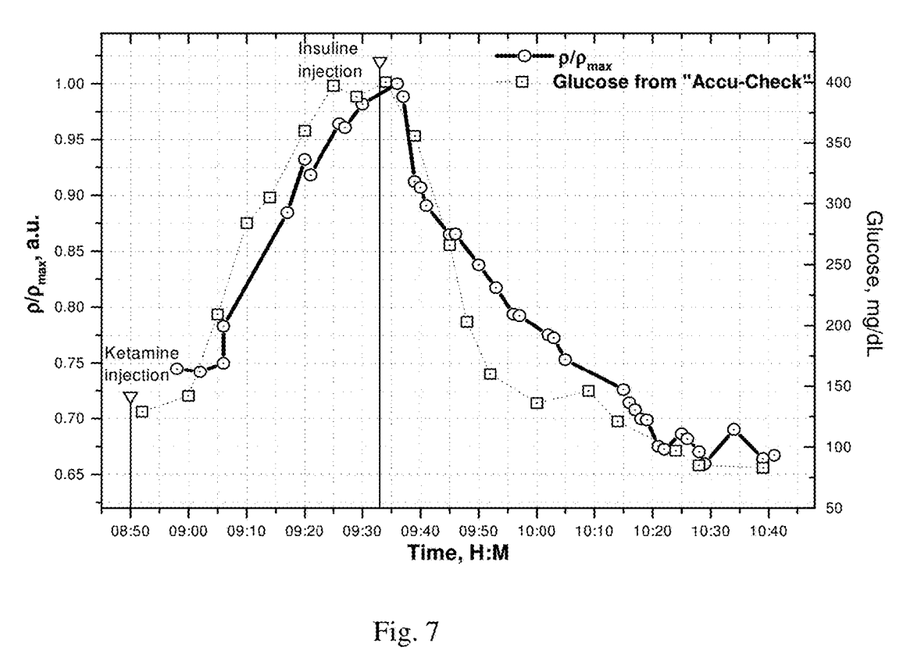
FIG. 7 depicts the results of in-vivo experiments made on rats.

FIG. 7 depicts the results of in-vivo experiments made on rats. The objective of the experiments was to verify the apparatus ability to follow the so-called sugar curve. FIG. 7 depicts normalized non-invasive measurements $\rho/\rho_{max}$ versus periodic invasive reference received with the "Accu-Check" device, where $\rho$ is defined by (5), and $\rho_{max}$ is the maximum of $\rho$. The rat has been immobilized by the ketamine-ksilazin injection at 8:50 and the insulin has been injected at 9:33. The non-invasive probe has been fixed on the tail. The blood samples for invasive analysis were taken from the tail edge periodically every five-seven minutes. Non-invasive measurements were conducted between the moments of pricking. The results indicate that the glucometer described above has the ability for instantaneous monitoring of glucose rapidly changing in a wide range.

One variant of the glucometer is designed for a human fingertip. Two small blood arteries lying a few mm in depth provide the optical path of 10-16 mm length, inducing a back-scattered signal of a clear pulsatile waveform. The optimal probe position can be reached by adjusting (rotating) the probe on the fingertip. Another advantage, of using the fingertip as the object of measurement, is that the glucometer can be firmly attached to the finger during walking or running.

In one embodiment, the glucometer may detect an increment of the instantaneous glucose concentration with regard to the reference. A fragment of the signal waveform is stored in the computing unit along with the related glucose concentration determined with other precise means such as an invasive or so-called "minimally invasive" glucose sensing device. The reference of the glucose concentration may be referred to as a basic point or zero for the measurement scale of the glucometer. The glucose level increment may then be determined by comparing the currently measured signal waveform with the reference waveform. The plot of the currently measured waveform may be tuned until it coincides with or is close enough to the stored reference waveform, which may be referred to as the 'distance' between the measurement and reference. The detected 'distance' is related to the difference between the current and the reference glucose. The procedure may be completed either recursively, with every new sample, or using a batch of samples over a period of time. This novel technique enables measuring of increments in the glucose concentration with regard to the patient 'normal' condition.

In another embodiment, the averaging of the instantaneous real-time measurements may be done over different time scales. Of note, the computing unit can accept the optical signal quantized by the analog-to-digital converter (ADC) and produce the output data stream at the same sample rate supported by the computing unit. The measurement duration computation is however restricted from below by physiological phenomena such as respiration or patient activity. Thus, a fast measurement can exhibit short-time glucose variation in blood and a more reliable glucose measurement may require a duration of at least a minute. In order to increase the steadiness of the glucose measurements, a 'mean' glucose level can be obtained by averaging over longer periods while 'fast' measurements can be used for detection of abrupt glucose changes.

In one embodiment, the glucometer input-output function is calibrated with auxiliary references invasively measured at different levels of proper patient's glucose range. Unlike the basic reference, auxiliary references do not require equalization of the optical channels. The auxiliary references can be added or removed in the interactive regime supported by the device. The quantity of references is not restricted and each auxiliary reference increases the glucometer accuracy. Over a relatively long period or when the patient condition changes, the basic reference may be revised.

In another embodiment, the polarization angle may be modulated by particular waveform, including—but not limited to—sine, square, or binary code, and sensed by an asynchronously rotating polarization detector. The angular shift is determined as a phase shift between the time-varying polarization angles of the incident and detected beams.

In one embodiment, the orthogonally polarized components of the detected light are converted into the digital form and are transmitted to a computing unit that calculates the polarization angle from the measured signal intensities, and then converts the polarization angle into the glucose concentration via a pre-determined empirically input-output function.

In one embodiment, the measurement is based on reflectance (rather than transmittance) glucometry. The reflectance glucose sensor does not require a thin part of the patient's body. Instead, it is suited to a universal application, including—but not limited to—the finger, wrist, feet, forehead, chest, or another part of the patient body in which a blood vessel is located close to the body surface and can be illuminated by the laser beam. Since the irradiation source and the optical detector are spatially separated by a certain distance, e.g. 10-16 mm, some part of the backscattered light has typically propagated through a blood vessel. Thus, the optical detector construction may be used to isolate the desired light component, which has propagated through the blood vessel, and compute the blood glucose concentration in the blood vessel, in contrast to prior art methods using reflectance glucometry that, typically indicate the glucose concentration in the tissue.

While the above description discloses many embodiments and specifications of the invention, these were described by way of illustration and should not be construed as limitations on the scope of the invention. The described invention may be carried into practice with many modifications which are within the scope of the appended claims.

The invention claimed is:

1. A non-invasive blood glucose measuring apparatus, for measuring a glucose level in an object of measurement, comprising:
   a. an irradiation source, for irradiating a narrow-band wavelength light into said object of measurement containing a blood vessel, comprising:
      i. a light-emitting source, for emitting a single narrow-band wavelength light beam of a narrow spectral shape;
      ii. an output polarizer, for polarizing said emitted narrow-band wavelength light beam into a single linearly polarized light beam;
      iii. a limiting aperture diaphragm, for irradiating the linearly polarized light into said object of measurement, in orthogonally to the illuminated surface of said object of measurement;
   b. an optical detector, for collecting and processing some of the light, irradiated by said irradiating source, which is back-scattered from the object of measurement, comprising:
      i. a Light Receiving Tube (LRT), for collecting some of said back-scattered light, which is essentially normal to the plane of the surface of said object of measurement, where said LRT, which is adapted to be in contact with the surface of said object of measurement at a point spatially separated, by a fixed distance, from the irradiation point of said irradiating source, where said collected back-scattered light comprises at least part of the back-scattered beam that has propagated through said blood vessel, which serves as an optical waveguide, between said light-emitting source and said LRT;
      ii. a beam splitter, for splitting said collected back-scattered light from the object of measurement, into two separate light beams;
      iii. two polarizers, for polarizing said two separate light beams into two orthogonally polarized beams;
      iv. two detector-amplifiers for detecting and amplifying the intensities of said two orthogonally polarized beams, where each of said detector-amplifiers detects and amplifies the intensity of one orthogonally polarized beam;
   c. sampling means, for sampling said orthogonally polarized beams, provided by said detector-amplifiers, for converting the data of said orthogonally polarized beams into sampled digital codes; and
   d. a computing unit for computing the glucose level in said object of measurement, based on a polarization angle, by processing said digital codes of said sampled orthogonally polarized beams, sensed by said detector-amplifiers, and by averaging said sampled digital codes, the computing unit comprising: an adaptive filter, for enhancing the cardiac pulse waveform for determining the polarization angle of said light back-scattered light from said object.

2. The blood glucose measuring apparatus according to claim 1, further comprising a narrowband optical filter, for extracting a particular wavelength of said back-scattered light.

3. The blood glucose measuring apparatus according to claim 1, further comprising a comparator, for providing the divergence of intensities of the two orthogonally polarized beams at a measurement phase for a reference level of glucose.

4. The blood glucose measuring apparatus according to claim 1, further comprising a correct position indicator, indicating whether the apparatus positioned on said object of measurement senses the pulsating stream of blood through a vessel and wherein the correct position is justified by a high AC/DC ratio in the enhanced cardiac pulse waveform.

5. The blood glucose measuring apparatus according to claim 1, wherein the beam splitter, the polarizers, and the detector-amplifiers form two optically equalized channels.

6. The blood glucose measuring apparatus according to claim 1, further comprising:
   a. determining means for determining the polarization angle of said light back-scattered from the patient body, wherein the polarization angle is determined by referring to intensities of the orthogonally polarized beams sensed by the two detector-amplifiers;
   b. calculating means for calculating the blood glucose value by referring to a predetermined relationship between said polarization angle and said blood glucose value, wherein the inclination of the detected polarization angle from the reference indicates the change of the blood glucose concentration with respect to a stored reference; and
   c. calibrating means for storing the reference glucose measurements and for calibrating with auxiliary references invasively measured at different levels of the patient's glucose range.

* * * * *